(12) United States Patent
Kimm et al.

(10) Patent No.: US 9,348,719 B2
(45) Date of Patent: May 24, 2016

(54) AUTOMATED TEST EQUIPMENT AND CONTROL METHOD THEREOF

(71) Applicant: Samsung Electronics Co., Ltd., Suwon-Si, Gyeonggi-Do (KR)

(72) Inventors: Deock-Kyum Kimm, Suwon-si (KR); Dae-Hwan Kim, Suwon-si (KR); Mi Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 132 days.

(21) Appl. No.: 14/197,384

(22) Filed: Mar. 5, 2014

(65) Prior Publication Data

US 2014/0258778 A1      Sep. 11, 2014

(30) Foreign Application Priority Data

Mar. 7, 2013  (KR) .................. 10-2013-0024211

(51) Int. Cl.
   *G06F 11/00*   (2006.01)
   *G06F 11/22*   (2006.01)

(52) U.S. Cl.
   CPC .................. *G06F 11/2294* (2013.01)

(58) Field of Classification Search
   CPC .................................................. G06F 11/2294
   USPC .................. 714/27, 28, 25, 31, 734
   See application file for complete search history.

(56) References Cited

U.S. PATENT DOCUMENTS

| | | | |
|---|---|---|---|
| 7,852,094 B2 | 12/2010 | Chraft et al. | |
| 8,078,424 B2 * | 12/2011 | Adachi | G01R 31/2834 702/120 |
| 2002/0162059 A1 * | 10/2002 | McNeely | H04L 12/2697 714/703 |
| 2008/0164894 A1 | 7/2008 | Kim et al. | |
| 2008/0221824 A1 * | 9/2008 | Kumaki | G06F 11/26 702/118 |
| 2009/0300442 A1 * | 12/2009 | Choi | G11C 29/56 714/718 |
| 2010/0131224 A1 * | 5/2010 | Maeda | G01R 31/31907 702/123 |
| 2011/0078525 A1 | 3/2011 | Xia et al. | |
| 2011/0099424 A1 | 4/2011 | Rivera Trevino et al. | |
| 2012/0197582 A1 * | 8/2012 | Richardson | G06F 11/2733 702/122 |

FOREIGN PATENT DOCUMENTS

| | | |
|---|---|---|
| JP | 1999083946 | 3/1999 |
| JP | 2008283366 A | 11/2008 |
| JP | 2009300248 A | 12/2009 |
| KR | 20010040192 A | 5/2001 |
| KR | 0896763 | 12/2008 |
| KR | 0921221 | 4/2009 |

* cited by examiner

*Primary Examiner* — Dieu-Minh Le
(74) *Attorney, Agent, or Firm* — Harness, Dickey & Pierce, P.L.C.

(57) ABSTRACT

An automated test system for a semiconductor device to concurrently perform multiple device tests is provided. The system may include at least one test client, at least one test site and a test server. The at least one test client is configured to receive a test request of at least one worker and to display a test response. The at least one test site is configured to test at least one device under test (DUT). The test server is configured to communicate with the at least one test client and the at least one test site, divide and/or drive the at least one test site in response to the test request of the at least one test client, and transmit a response of the at least one test site to the at least one test client.

15 Claims, 6 Drawing Sheets

AUTOMATED TEST EQUIPMENT AND CONTROL METHOD THEREOF

CROSS-REFERENCE TO RELATED APPLICATION

This application claims priority under 35 USC §119 to Korean Patent Application No. 10-2013-0024211 filed on Mar. 7, 2013 in the Korean Intellectual Property Office (KIPO), the entire disclosure of which is incorporated herein by reference.

BACKGROUND

1. Field

Example embodiments relate to an automated test equipment and/or a control method thereof. More particularly, example embodiments relate to an automated test equipment, which enables a plurality of workers to test at least one DUT, and/or a control method thereof.

2. Description of the Related Art

As semiconductor chips are highly integrated with high performance, a large amount of time and resources are required to test the semiconductor chips. In order to maintain the quality of the semiconductor chips and improve test efficiency, a design for testability (DFT) technology has been extensively used.

In addition, recently, a multi-site test technology is used to support a plurality of site testing works through one automated test equipment (ATE). A site controller is provided at a site, and a test program is downloaded from the ATE to test a device. In this case, the device may be referred to as a device under test (DUT).

However, even though the ATE according to the related art has a multi-site testing function, since the ATE has a 1:1 worker interface, other workers cannot input a test request to the ATE during the test request of one worker.

SUMMARY

Some example embodiments provide an automated test equipment, enabling or otherwise allowing at least two workers to independently perform device tests through a multi-concurrent access scheme to maximize the use efficiency of the automated test equipment, and a control method thereof.

According to one example embodiment, an automated test system for a semiconductor device to concurrently perform multiple device tests is provided. The system may include at least one test client, at least one test site and a test server. The at least one test client is configured to receive a test request of at least one worker and to display a test response. The at least one test site is configured to test at least one device under test (DUT). The test server is configured to communicate with the at least one test client and the at least one test site, divide and/or drive the at least one test site in response to the test request of the at least one test client, and transmit a response of the at least one test site to the at least one test client.

In an example embodiment, the at least one test site is further configured to execute a test program downloaded from the test server to test the at least one DUT.

In an example embodiment, the at least one test site is further configured to execute mutually different test programs with respect to at least two types of DUTs to test the at least two types of the DUTs.

In an example embodiment, the mutually different test programs may be downloaded from the test server.

In an example embodiment, the at least one test site is further configured to execute mutually different test programs associated with at least two types of DUTs, and may perform at least one test on the at least two types of the DUTs.

In an example embodiment, the test site is configured to test the at least two types of the DUTs simultaneously.

In an example embodiment the test server is configured to communicate with the at least one test client using one of an Inter-Process Communication (IPC) and a Remote Procedure Call (RPC).

In an example embodiment, the test server is configured to communicate using the IPC, and is further configured to independently communicate with at least one processor of the at least one test client according to the IPC.

In an example embodiment, the test server is configured to communicate using the RPC, and is further configured to provide a communications interface to the at least one test client for the at least one test client to communicate with the test server according to the RPC.

In an example embodiment, the at least one test site is configured to operate asynchronously.

According to another example embodiment, a control method of for controlling a test server to perform multiple device tests is provided. The method includes receiving a test request from the at least one test client, instructing a corresponding test site from among a plurality of test sites to test a corresponding device under test (DUT) in response to the received test request, receiving an uploaded test result from at least one test site, and transmitting the received test result to the at least one test client.

In an example embodiment, the method further includes providing the at least one test site with a test program, the test site configured to execute the test program to test the at least one DUT.

In an example embodiment, the method further includes providing the at least one test site with at least two mutually different test programs each having a corresponding DUT, the test site configured to execute the mutually different test programs to test at least two types of the DUTs.

In an example embodiment, the method further includes providing the at least one test site with at least two mutually different test programs each having a corresponding DUT, the test site configured to execute the mutually different test programs to test at least two types of the DUTs.

In an example embodiment, the test server communicates with the at least one test client based on one of Inter-Process Communication (IPC) and Remote Procedure Call (RPC).

According to another example embodiment, a test server for concurrently scheduling multiple device tests on a device under test (DUT) is provided. The test server is configured to receive a plurality of test requests from a plurality of test clients, each of the plurality of test requests corresponding to a DUT to be tested by a test site, and divide the test site according to each of the plurality of test requests that are received such that each DUT is tested concurrently using the test site.

In an example embodiment, the test server is further configured to provide a plurality of mutually different test programs to the test site, each one of the plurality of mutually different test programs being used test a corresponding one of the DUTs.

In an example embodiment, each of the plurality of the test requests includes a client identification code, test site data, at least one DUT to be tested, and at least one of the plurality of mutually different test programs, and the at least at least one DUT to be tested corresponds to the at least one of the plurality of mutually different test programs.

In an example embodiment, the test server is further configured to transmit a test response to each of the plurality of test clients, the test response corresponding to a tested DUT, the test response including test site data, data associated with the tested DUT, and test result data associated with the tested DUT.

In an example embodiment, the test server is further configured to provide a user interface to each of the plurality of test clients, each of the plurality of test requests being received via the provided user interface.

Accordingly, since the at least two workers concurrently share one automated test equipment to perform mutually independent test works, a division-driving of the test site or a mixed test work is possible. Therefore, the operating efficiency of the automated test equipment having the multi-site testing function can be maximized, and the test work efficiency can be improved.

BRIEF DESCRIPTION OF THE DRAWINGS

Features will become apparent to those of ordinary skill in the art by describing in detail exemplary embodiments with reference to the attached drawings in which.

DETAILED DESCRIPTION OF THE EMBODIMENTS

Figure 1:
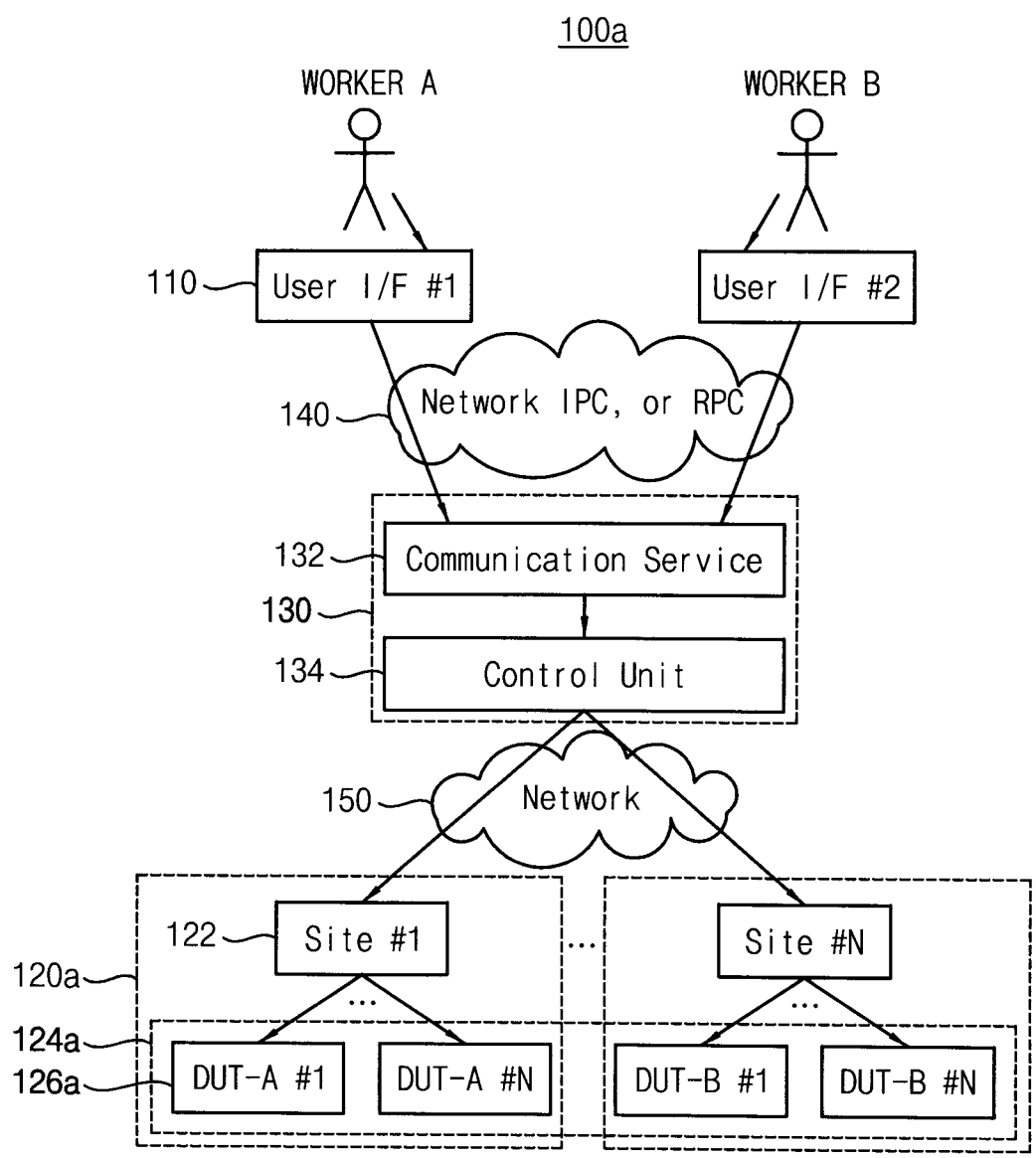
FIG. 1 is a schematic diagram illustrating an automated test equipment according to an example embodiment.

Various example embodiments will be described more fully with reference to the accompanying drawings, in which embodiments are shown. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be described with reference to accompanying drawings. The same elements will be assigned with the same reference numerals, and the repetition in the description of the same elements will be omitted.

FIG. 1 is a schematic diagram illustrating an automated test equipment according to an example embodiment.

Referring to FIG. 1, an automated test equipment 100a includes test clients 110, test sites 120, and a test server 130.

The test clients 110 may communicate with the test server 130 through a network 140, such that the test clients 110 and the test server 130 may exchange information. The test sites 120a may communicate with the test server 130 through a network 150, such that the test sites 120a and the test server 130 may exchange information.

The test clients 110 may include separate computers, such as desktop computers, laptop computers, tablet computers, smart phones, and/or other like computing devices to receive a test request from each worker and display a test response. The test clients 110 may provide an environment in which a worker can make a test program suitable for the characteristic of a device under test (DUT). Each of the test clients 110 may upload a test program to the test server 130. In addition, the test clients 110 may provide an environment in which the worker may download and analyze test result data.

The test server 130 includes a communication service 132 that may communicate with the test clients 110 and a control unit 134. In other words, the test server 130 tests at least one DUT together with at least one test site (e.g., test site 120a). The test server 130 may communicate with the client 110 and the test site 120a through a network (e.g., network 140, network 150, and/or other like networks). The test site 120a may respond to a test request of the test client 110, and transmit a response to the at least one test client 110. According to various embodiments, the test sites are divided, such that workers may concurrently test DUTs separately. Accordingly, test sites may be thought of as "division-driven".

The network 140 may be constructed through an Inter Process Communication (IPC) protocol or a Remote Procedure Call (RPC) protocol. IPC may be a set of methods for exchanging data among multiple threads in one or more processes, where the processes may be running on one or more processors connected by a network (e.g., network 140). According to IPC, the network 140 may share a memory together with a processor of the test server 130 to independently communicate with processors of the test clients in order to exchange information. According to RPC, a computer program may allow a function and/or a procedure to be executed to remotely control another address space, and network programming is made at a function call level to construct a remote call client/server structure. Accordingly, the communication service 132 of the test server 130 may act as an interface between the network 140 and the control unit 134.

Figure 2:
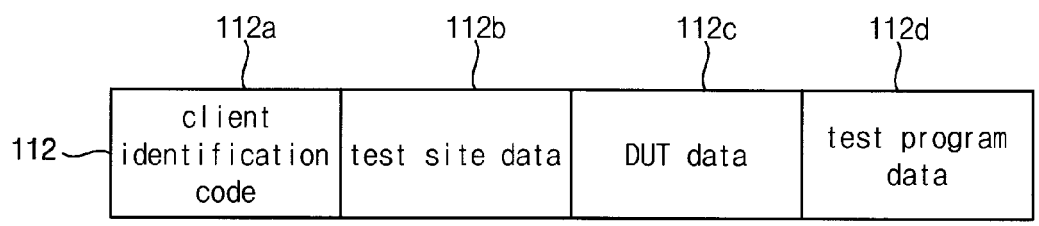
FIG. 2 is a diagram illustrating test request information of the test client according to an example embodiment.
Figure 3:
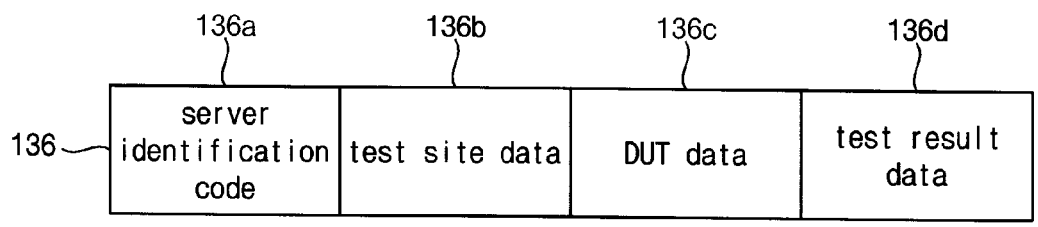
FIG. 3 is a diagram illustrating test request information of the test server according to an example embodiment.

FIG. 2 is a diagram illustrating test request information 112 of the test client 110 according to an example embodiment. FIG. 3 is a diagram illustrating test request information 132 of the test server 130 according to an example embodiment.

Each worker may communicate with the test server 130 using the test client 110 to transmit independent test request information 112. As shown in FIG. 2, the test request information 112 may include a client identification code 112a, test site data 112b, DUT data 112c, and test program data 112d. The test program data 112d may include a test program, which is newly made, or designated data of a test program that is previously uploaded to the test server 130.

The test server 130 may process independent and/or mutually independent test requests from workers and transmits the test response information 136 thereof to the test client 110 of each worker. It should be noted that the term "mutually independent" may mean that the occurrence of one event does not affect the probability of an occurrence of another event. As shown in FIG. 3, the test response information 136 may include a server identification code 136a, test site data 136b, DUT data 136c, and test result data 136d.

Referring back to FIG. 1, the control unit 134 receives via the network 140 a test control program, a test program, and test data, which are used for a test. The network 150 connects the control unit 134 to the test site 120a and relays communications between the control unit 134 and the test site 120a. In this case, the test control program may include a plurality of test site control programs that are independently executed with little or no interference in order to individually control the test sites 120a.

Each test site 120a includes a test site controller 122 and a plurality of test modules 124a. The test site 120a tests DUTs 126a, which are connected to a plurality of test modules 124a, in parallel. The test site 120a controls a switch matrix according to the number of input/output pints of the DUT 126a and the type of the test module 124a to set a connection type.

In various embodiments, the test site controller 122 obtains the test control program from the control unit 134 through the network 150 to execute the test control program. Next, the test site controller 122 obtains a test program and test data used for the test of the DUT 126a from the control unit 134 based on the test control program. The test site controller 122 then contains the test program and the test data in the test module 124a used for the test of the DUT 126a. Next, the test site controller 122 instructs the test module 124a to start the test based on the test program and the test data. In various embodiments, the test site controller 122 may receive an interrupt to instruct the test termination from the test module 124a, and may instruct each test module to perform a next test based on the test result. In other words, each of a plurality of the test site controllers 122 controls a plurality of test modules 124a based on each test result of a plurality of DUTs 126a and uses mutually different test sequences for the DUTs 126a together. It should be noted that the term "mutually different" may mean non-overlapping or otherwise separate.

According to the example embodiment of FIG. 1, the test sites 120a test mutually different DUTs 126a. In other words, each of the test site controllers 122 may perform independent and/or mutually independent control functions such that a test site controller Site#1 may test a DUT DUT-A, and a test site controller Site#N may test a DUT DUT-B. Accordingly, the test sites may be division-driven or otherwise divided, such that workers A and B may concurrently test the DUTs DUT-A and DUT-B different from each other. According to various example embodiments, at least one test site 120a may operate asynchronously.

Figure 4:
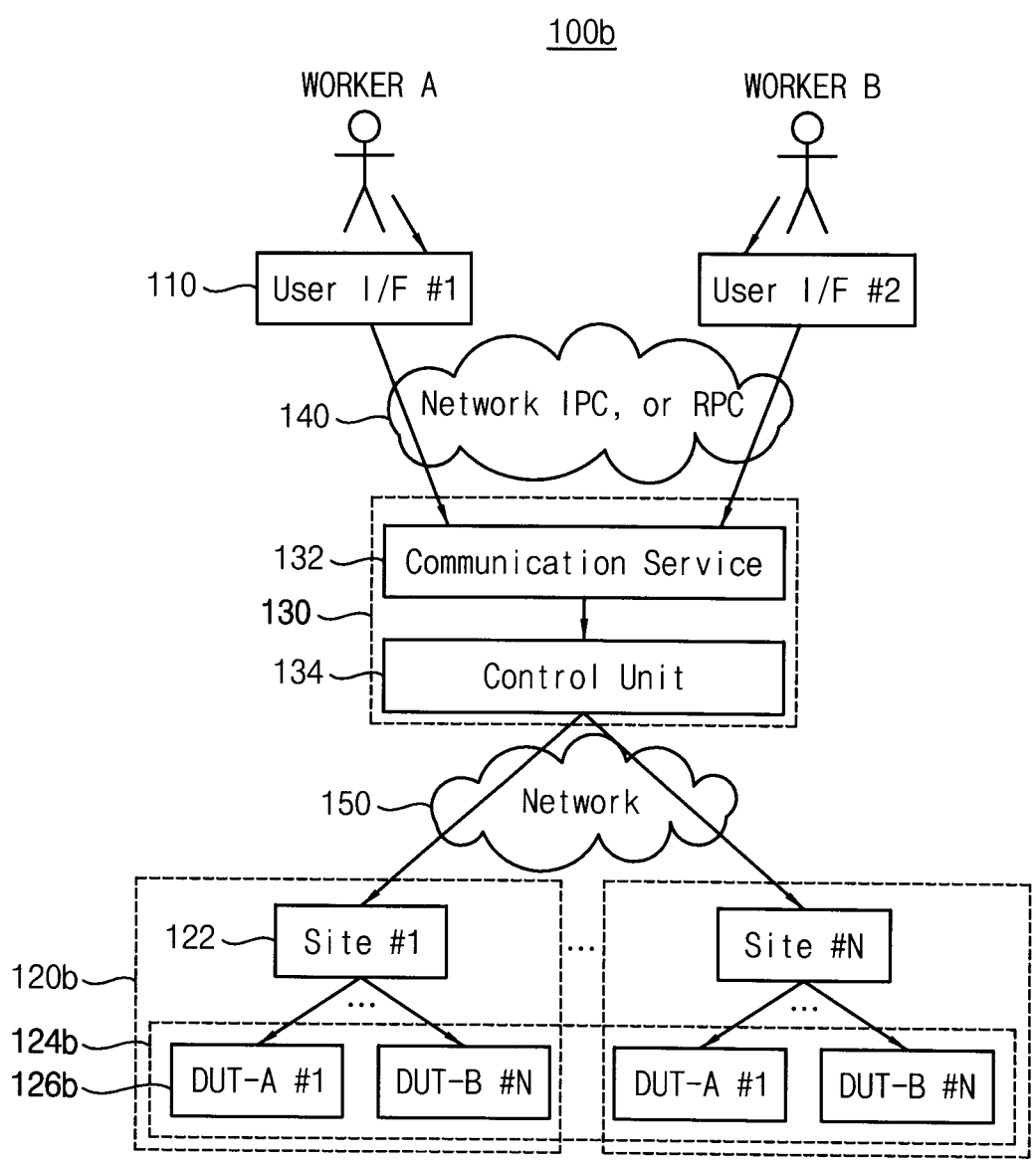
FIG. 4 is a schematic view illustrating an automated test equipment according to an example embodiment.

FIG. 4 is a schematic diagram for explaining an automated test equipment according to an example embodiment.

According to an automated test equipment 100b of FIG. 4, when compared with the automated test equipment 100a of FIG. 1 described above, a mixed testing scheme of testing mutually different types of DUTs 126b in a test site is shown. Accordingly, the same reference element will be assigned with the same element.

Figure 5:
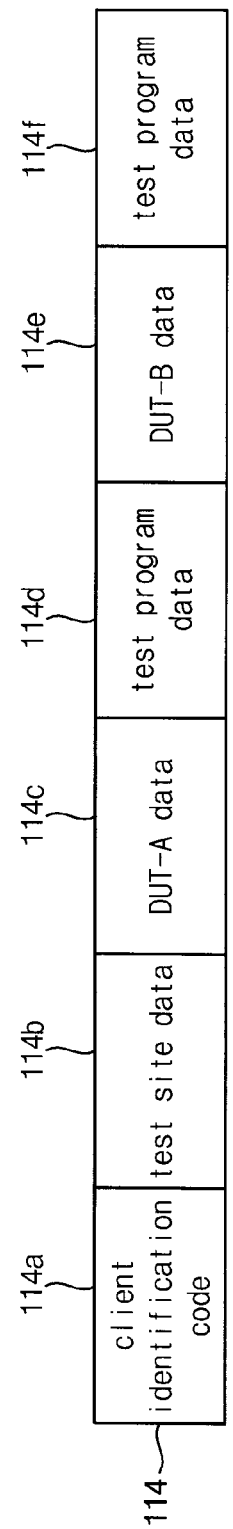
FIG. 5 is a diagram illustrating test request information of the test client according to an example embodiment.
Figure 6:
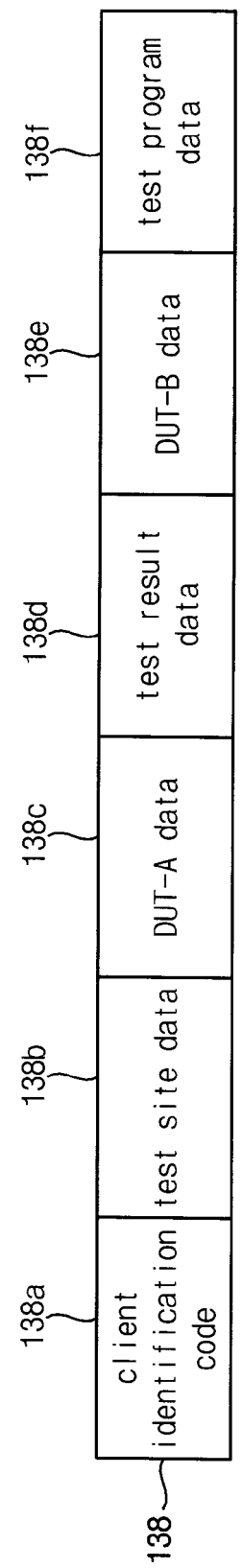
FIG. 6 is a diagram illustrating test request information of the test server according to an example embodiment.

FIG. 5 is a diagram illustrating test request information 114 of the test client 110 according to an example embodiment. FIG. 6 is a diagram illustrating test request information 138 of the test server 130 according to an example embodiment.

Each of the workers A and B may communicate with the test server 130 by using the corresponding test client 110 of the worker to transmit an independent test request information 112 of the worker. As shown in FIG. 5, the test request information 114 may include a client identification code 114a, test site data 114b, DUT-A data 114c, test program data 114d, DUT-B data 114e, and test program data 114f. The test program data 114d may include a test program for a DUT DUT-A, which in various embodiments is a newly made test program, or designate data of a test program that is previously uploaded to the test server 130 and stored in the test server 130. The test program data 114f may include a test program for a DUT DUT-B, which in various embodiments is a newly made test program, or designated data of a test program that is previously uploaded to the test server 130 and stored in the test server 130. As shown in FIG. 6, the test request information 138 may include a client identification code 138a, test site data 138b, DUT-A data 138c, test result data 138d, DUT-B data 138e, and test program data 138f.

In other words, the worker A may concurrently test the DUTs DUT-A and DUT-B through the test site 120b. In this case, the test module 124b of the DUT DUT-A is different from the test module 124b of the DUT DUT-B, and different connection types of the switching matrix of the test site controller 122 are set with respect to the DUTs DUT-A and DUT-B.

Figure 7:
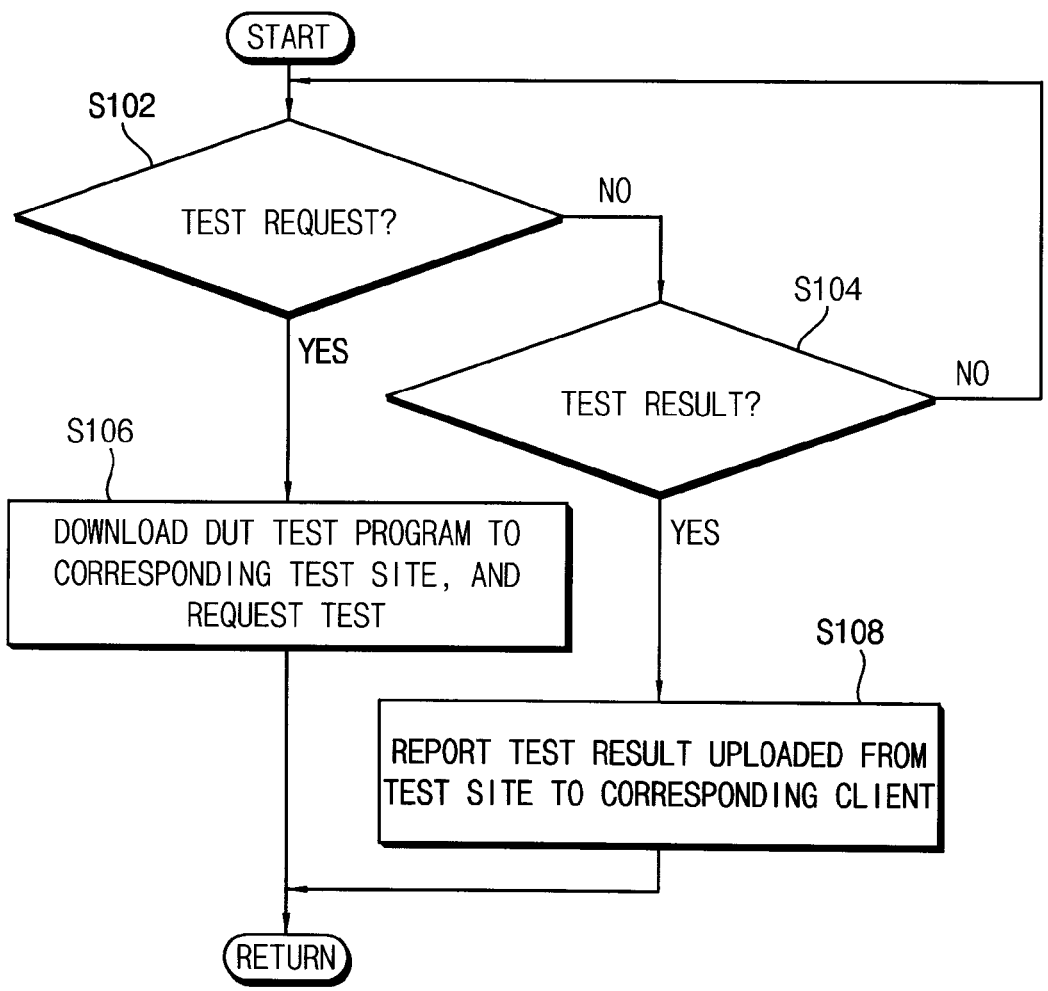
FIG. 7 is a flowchart illustrating a control method of the control unit according to an example embodiment.

FIG. 7 is a flowchart illustrating a test control method of the control unit 134 according to an example embodiment.

As shown in operation S102, a control unit 134 determines whether a test request is made from the test clients 110 through a communication service 132. If the test request is not made, the control unit 134 proceeds to operation S104 to determine whether the request for the upload of a test result is made from test sites 120.

If the test result is determined to have been uploaded in operation S104, then the control unit 134 proceeds to operation S108 to report the test result that is uploaded from the test site which corresponds to the client. In various embodiments, the test response information 136 including the uploaded test result data is generated, and the generated test response information 136 is transmitted to a corresponding test client 110 through the communication service 132.

Referring back to operation S102, if it is determined that the test request is received, then the control unit 134 proceeds to operation S106 to download a DUT test program to a corresponding test site (e.g., test site 120a). In various embodiments, operation S106 may also include checking a client identification code 112a of the received test request information 112, a test program, and test data related to the DUT data that is downloaded to the corresponding test site 120a in response to test-requested test site data.

As described above, according to the automated test equipment of the example embodiments, at least one test client and a test server are connected to each other through a client/server scheme, such that a plurality of workers can concurrently request separate and/or different tests. Accordingly, the automated test equipment of the example embodiments may enhance the flexibility of a test work environment in a system to produce various semiconductor devices and can concurrently and/or simultaneously test DUTs that are different from each other, without interference.

The example embodiments are applicable to a system of testing various semiconductor devices since the automated test equipment according to the example embodiment can represent maximized work efficiency and concurrently test mutually different DUTS together.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An automated test system, the automated test system comprising:
   at least one test client;
   at least one test site; and
   a test server communicatively coupled to the test client and the at least one test site;
   the at least one test client being configured to
      receive a test request of at least one worker,
      communicate the test request to the test server, and
      display a test response of the at least one test site based on receiving the test response from the test server;
   the at least one test site being configured to
      test at least one semiconductor chip device under test (DUT) based on being driven by the test server, and
      generate the test response based on testing the at least one semiconductor chip DUT; and
   the test server being configured to
      communicate with the at least one test client and the at least one test site,
      receive the test request from the at least one test client,
      drive the at least one test site in response to the test request of the at least one test client such that the at least one test site tests the at least one semiconductor chip DUT based on the test request,
      receive the test response of the at least one test site, and
      transmit the test response of the at least one test site to the at least one test client such that the at least one test client displays the test response of the at least one test site.

2. The automated test system of claim 1, wherein the at least one test site is further configured to:
   execute a test program downloaded from the test server to test the at least one semiconductor chip DUT.

3. The automated test system of claim 1, wherein the at least one test site is further configured to:
   execute mutually different test programs with respect to at least two types of semiconductor chip DUTs to test the at least two types of the semiconductor chip DUTs.

4. The automated test system of claim 3, wherein the mutually different test programs are downloaded from the test server.

5. The automated test system of claim 1, wherein the at least one test site is further configured to:
   execute mutually different test programs associated with at least two types of semiconductor chip DUTs, and
   perform at least one test on the at least two types of the semiconductor chip DUTs.

6. The automated test system of claim 5, wherein the test site is configured to test the at least two types of the semiconductor chip DUTs simultaneously.

7. The automated test system of claim 1, wherein the test server is configured to communicate with the at least one test client using one of an Inter-Process Communication (IPC) and a Remote Procedure Call (RPC).

8. The automated test system of claim 7, wherein the test server is configured to communicate using the IPC, and is further configured to independently communicate with at least one processor of the at least one test client according to the IPC.

9. The automated test system of claim 7, wherein the test server is configured to communicate using the RPC, and is further configured to:
   provide a communications interface to the at least one test client for the at least one test client to communicate with the test server according to the RPC.

10. The automated test system of claim 1, wherein the at least one test site is configured to operate asynchronously.

11. A test server for concurrently scheduling multiple device tests on a semiconductor chip device under test (DUT), the test server configured to:
   receive a plurality of test requests from a plurality of test clients, each of the plurality of test requests corresponding to a semiconductor chip DUT of a plurality of semiconductor chip DUTs to be tested by a test site, the test site being configured to test each semiconductor chip DUT based on at least one test request; and
   divide the test site according to each of the plurality of test requests that are received such that the test site tests each semiconductor chip DUT of the plurality of semiconductor chip DUTs concurrently based on a separate test request of the plurality of test requests.

12. The test server of claim 11, further configured to:
   provide a plurality of mutually different test programs to the test site, each one of the plurality of mutually different test programs being used to test a corresponding one of the semiconductor chip DUTs.

13. The test server of claim 12, wherein each of the plurality of the test requests includes a client identification code, test site data, at least one semiconductor chip DUT to be tested, and at least one of the plurality of mutually different test programs,
   the at least at least one semiconductor chip DUT to be tested corresponding to the at least one of the plurality of mutually different test programs.

14. The test server of claim 11, further configured to:
   transmit a test response to each of the plurality of test clients, the test response corresponding to a tested semiconductor chip DUT, the test response including test site data, data associated with the tested semiconductor chip DUT, and test result data associated with the tested semiconductor chip DUT.

15. The test server of claim 11, further configured to:
provide a user interface to each of the plurality of test clients, each of the plurality of test requests being received via the provided user interface.

* * * * *